US010128732B2

(12) United States Patent
Aoyama et al.

(10) Patent No.: US 10,128,732 B2
(45) Date of Patent: Nov. 13, 2018

(54) LINEAR MOTOR

(75) Inventors: Yasuaki Aoyama, Tokyo (JP); Akiyoshi Komura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 991 days.

(21) Appl. No.: 14/376,266

(22) PCT Filed: Feb. 20, 2012

(86) PCT No.: PCT/JP2012/001086
§ 371 (c)(1),
(2), (4) Date: Aug. 1, 2014

(87) PCT Pub. No.: WO2013/124875
PCT Pub. Date: Aug. 29, 2013

(65) Prior Publication Data
US 2015/0001969 A1  Jan. 1, 2015

(51) Int. Cl.
*H02K 41/02* (2006.01)
*H02K 41/03* (2006.01)

(52) U.S. Cl.
CPC .......... *H02K 41/02* (2013.01); *H02K 41/031* (2013.01)

(58) Field of Classification Search
CPC .... H02K 7/1869; H02K 7/1876; H02K 41/02; H02K 41/03; H02K 41/031;
(Continued)

(56) References Cited

U.S. PATENT DOCUMENTS 3,610,784 A * 10/1971 Rundell ................. F25B 31/02
310/216.133
4,859,974 A * 8/1989 Kliman .................. H02K 41/03
310/12.24

(Continued)

FOREIGN PATENT DOCUMENTS

CN 2447981 Y 9/2001
CN 2550953 Y 5/2003
(Continued)

OTHER PUBLICATIONS

Extended European Search Report issued in counterpart European Application No. 12868956.9 dated Mar. 10, 2016 (Ten (10) pages).
(Continued)

*Primary Examiner* — Thomas Truong
*Assistant Examiner* — Minki Chang
(74) *Attorney, Agent, or Firm* — Crowell & Moring LLP

(57) ABSTRACT

Provided is a highly responsive linear motor that can be constructed by reducing the weight of a mover. In order to attain this object, the linear motor includes a secondary side in which magnets and ladder-shaped members of a magnetic material are arranged in alternate manner in a rectilinearly moving direction of the mover, the ladder-shaped members each holding one of the magnets; and a primary side that includes magnetic pole pieces arranged in close proximity to the secondary side from above and below in a direction perpendicular to the rectilinearly moving direction with a common coil wound around each of the magnetic pole pieces, the primary side including a magnetic material core interconnecting the magnetic pole pieces; wherein the ladder-shaped members of a magnetic material are formed with grooves.

11 Claims, 13 Drawing Sheets

(58) Field of Classification Search
CPC ............... H02K 41/033; H02K 41/035; H02K 41/0356; H02K 49/102
USPC ......... 310/12.01, 12.15, 12.17, 12.18, 12.24, 310/12.25, 12.26
See application file for complete search history.

(56) References Cited

U.S. PATENT DOCUMENTS

| | | | |
|---|---|---|---|
| 5,179,304 | A | 1/1993 | Kenjo et al. |
| 8,466,587 | B2 | 6/2013 | Aoyama |
| 2002/0053835 | A1 | 5/2002 | Joong et al. |
| 2003/0185091 | A1* | 10/2003 | Koike ................. B29C 45/5008 366/92 |
| 2005/0046282 | A1 | 3/2005 | Tang et al. |
| 2005/0062356 | A1 | 3/2005 | Hoppe et al. |
| 2007/0152515 | A1 | 7/2007 | Motherway et al. |
| 2009/0026847 | A1 | 1/2009 | Kim et al. |
| 2011/0221284 | A1* | 9/2011 | Kakihara ............. H02K 41/031 310/12.26 |
| 2011/0298308 | A1* | 12/2011 | Aoyama ................ H02K 41/03 310/12.15 |
| 2012/0286592 | A1* | 11/2012 | Bojiuc ................... H02K 21/24 310/12.24 |
| 2013/0082545 | A1* | 4/2013 | Goto ...................... H02K 41/02 310/12.24 |

FOREIGN PATENT DOCUMENTS

| | | |
|---|---|---|
| CN | 101371428 A | 2/2009 |
| CN | 101552535 A | 10/2009 |
| CN | 102214983 A | 10/2011 |
| CN | 102326324 A | 1/2012 |
| EP | 0 280 743 A1 | 9/1988 |
| EP | 1 511 163 A2 | 3/2005 |
| EP | 2 012 414 A2 | 1/2009 |
| EP | 2 073 345 A2 | 6/2009 |
| JP | 61-210864 A | 9/1986 |
| JP | 62-126857 A | 6/1987 |
| JP | 2002-142439 A | 5/2002 |
| JP | 2005-102486 A | 4/2005 |
| JP | WO 2010103575 A1 * | 9/2010 ............. H02K 41/03 |
| JP | 2011-223697 A | 11/2011 |
| JP | WO 2011155022 A1 * | 12/2011 ............. H02K 41/02 |
| JP | 2012-16279 A | 1/2012 |
| JP | 2013-34385 A | 2/2013 |
| JP | 2013-102695 A | 5/2013 |
| WO | WO 03/100943 A2 | 12/2003 |
| WO | WO 2007/116508 A1 | 10/2007 |
| WO | WO 2010/103575 A1 | 9/2010 |
| WO | WO 2011/155022 A1 | 12/2011 |

OTHER PUBLICATIONS

Chinese-language Office Action issued in counterpart Chinese Application No. 201280068551.0 dated Dec. 24, 2015 (Seven (7) pages).
Chinese-language Office Action issued in counterpart Chinese Application No. 201280068551.0 dated May 4, 2016 (Ten (10) pages).
Corresponding International Search Report dated May 22, 2012 with English Translation (four (4) pages).

* cited by examiner

LINEAR MOTOR

TECHNICAL FIELD

The present invention relates to highly responsive linear motors.

BACKGROUND ART

Conventional linear motors have a structure similar to that of a cut-open rotary machine in shape, and generate great magnetic attraction acting between a mover including a magnet array, and a stator. In these linear motors, therefore, a member for supporting the mover is subjected to a heavy load. In addition, ripples in force due to discontinuity of a magnetic circuit, and other unwanted events occur at end portions of the stator.

Among the measures taken to improve the above disadvantages is the technique described in Patent Document 1, for example.

In a linear motor applying the technique described in Patent Document 1, magnets are fixed to a ladder-shaped member, as shown in FIGS. 1 and 9 that accompany Patent Document 1. That is, the linear motor needs to have members for supporting the magnets, which will increase the mass of a mover.

To construct a highly responsive linear motor, it is necessary to use a mover reduced in mass.

PRIOR ART LITERATURE

Patent Document

Patent Document 1: International patent publication WO2010/103575

SUMMARY OF THE INVENTION

Problem to be Solved by the Invention

A problem to be solved by the present invention is how to reduce the mass of a mover.

Means for Solving the Problem

In order to solve the above problem, the present invention provides a linear motor comprising: a secondary side having magnets and ladder-shaped members of a magnetic material, the magnets and the ladder-shaped members of a magnetic material being arranged in alternate manner in a rectilinearly moving direction of the secondary side, each of the ladder-shaped members holding one of the magnets; and a primary side including magnetic pole pieces arranged in close proximity to the secondary side from above and below in a direction perpendicular to the rectilinearly moving direction with a common coil wound around each of the magnetic pole pieces, the primary side including a magnetic material core interconnecting the magnetic pole pieces; wherein each of the ladder-shaped members of a magnetic material is formed with a groove.

Effects of the Invention

The ladder-shaped members of a magnetic material are grooved, which enables reduction in a weight of the mover, suppresses magnetic flux shunting of the magnets, which occurs in a vicinity of the magnets, and improves thrust. As a result, response characteristics are enhanced by advantageous effects of the reduction in the weight of the mover and the improvement of the thrust.

MODE FOR CARRYING OUT THE INVENTION

Hereunder, embodiments of the present invention will be described using the accompanying drawings.

In all of the following embodiments, a stator will be described as a primary side, and a mover as a secondary side.

First Embodiment

An example of a linear motor with grooves provided between adjacent magnets is described as a first embodiment below.

Figure 1:
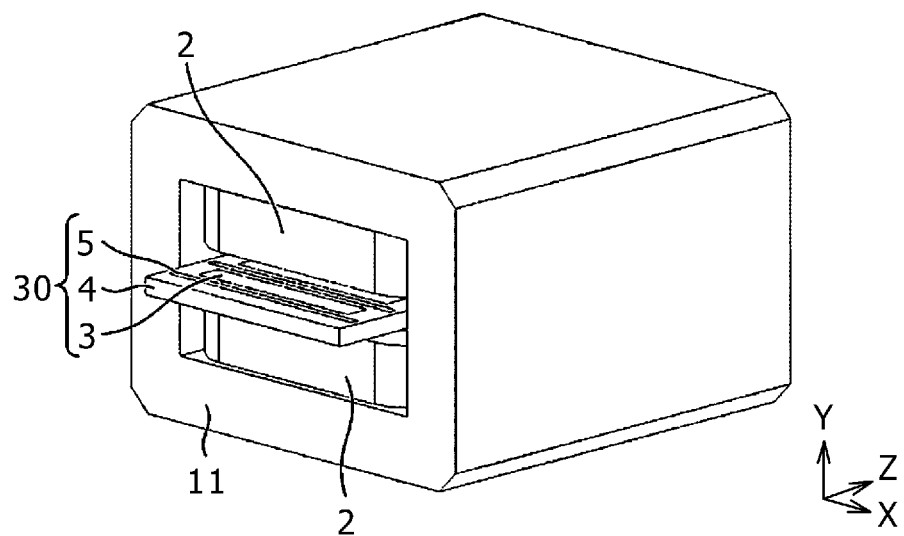
FIG. 1 is a conceptual diagram of one phase of a linear motor grooved between magnets.

FIG. 1 is a schematic diagram of a stator and mover constituting one phase of the linear motor according to the present embodiment. A plurality of units, each including the stator and mover shown in FIG. 1, are coupled to each other to construct a linear motor driven in a plurality of phases. A three-phase linear motor, for example, can be constructed by arranging side by side three units shown in FIG. 1.

Figure 2:
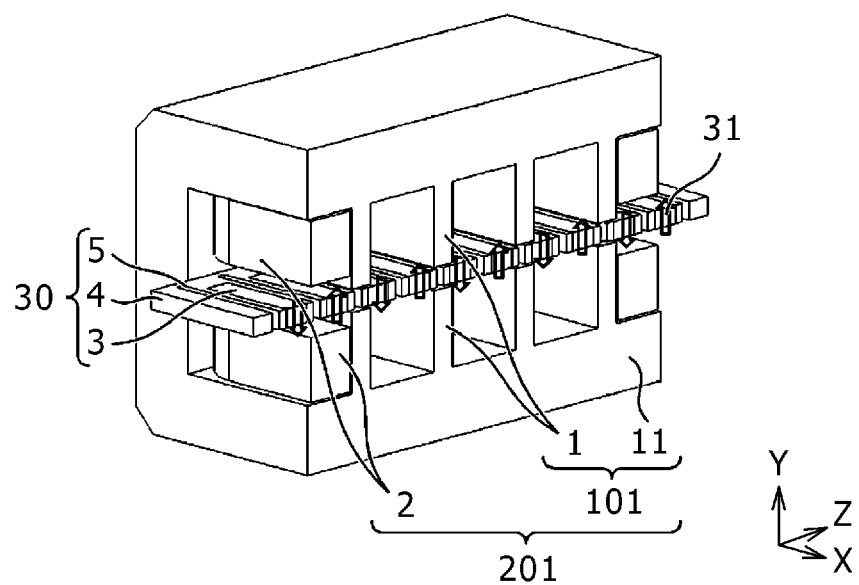
FIG. 2 is a schematic diagram showing an internal structure obtained by cutting off the linear motor structure of FIG. 1 along a Y-Z plane.

FIG. 2 is a schematic diagram showing an internal structure obtained by cutting off the linear motor of FIG. 1 along a Y-Z plane. The mover 30 includes magnets 3, ladder-shaped members 4 of a magnetic material, and grooves 5. The stator 201 includes a magnetic circuit section 101. The magnetic circuit section 101 includes magnetic pole pieces 1 arranged in close proximity to the magnets 3 from above and below in a direction perpendicular to a rectilinearly moving direction of the mover, and a magnetic material core 11 interconnecting the magnetic pole pieces 1. The magnetic pole pieces 1 are arranged in a direction of a Z-axis with a common coil 2 wound around each of the magnetic pole pieces 1. The coil 2 is wound around each of the upper and lower magnetic pole pieces 1.

In the present embodiment, four magnetic pole pieces each having upper and lower magnetic pole pieces around each of which a coil is wound are arranged in the Z-axis direction. The number of magnetic pole pieces, however, is not limited to four.

In FIG. 2, a magnetization direction 31 of the magnets 3 is also shown schematically near a lateral face of each of the magnets. The magnets 3 are arranged at pitches of $\tau$ in the direction of the Z-axis. The magnets 3 become magnetized in both two vertical directions along a Y-axis, are each arrayed so as to become magnetized in an opposite direction with respect to adjacent magnets, and are each fixed to one of the ladder-shaped members 4 of a magnetic material. The grooves 5 are disposed in the ladder-shaped members 4 of a magnetic material. The grooves 5 are each disposed between the adjacent magnets.

In addition, the four magnetic pole pieces 1 disposed in the direction of the Z-axis are arranged at pitches of $2\tau$, which is twice the arrangement pitch of $\tau$ of the magnets.

The disposition of the grooves 5 in the ladder-shaped members 4 of a magnetic material, which constitute a part of the mover 30, reduces a weight of the mover 30, while at the same time suppressing magnetic flux shunting of the magnets and enhancing thrust. Response characteristics of the mover improve as a result.

Figure 3:
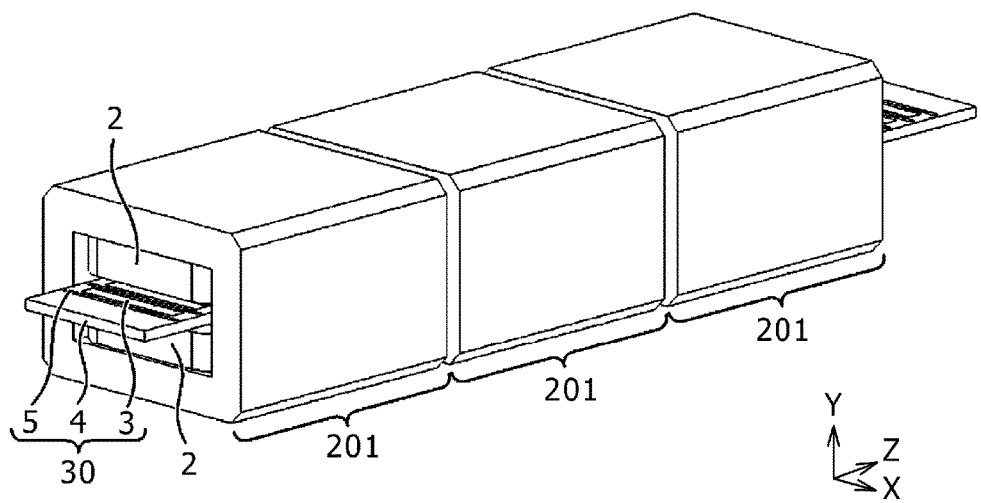
FIG. 3 is a drawing of a three-phase linear motor employing the structure shown in FIG. 1.

FIG. 3 shows an example of a three-phase linear motor configuration according to the present embodiment. A mover 30 extends through three stators 201. The three stators are arranged so that respective electrical phases shift by 120 degrees each. This enables the three-phase linear motor to be constructed. Similarly, a linear motor driven in an "m" number of phases can be constructed by arranging an "m" number of stators.

Second Embodiment

Figure 4:
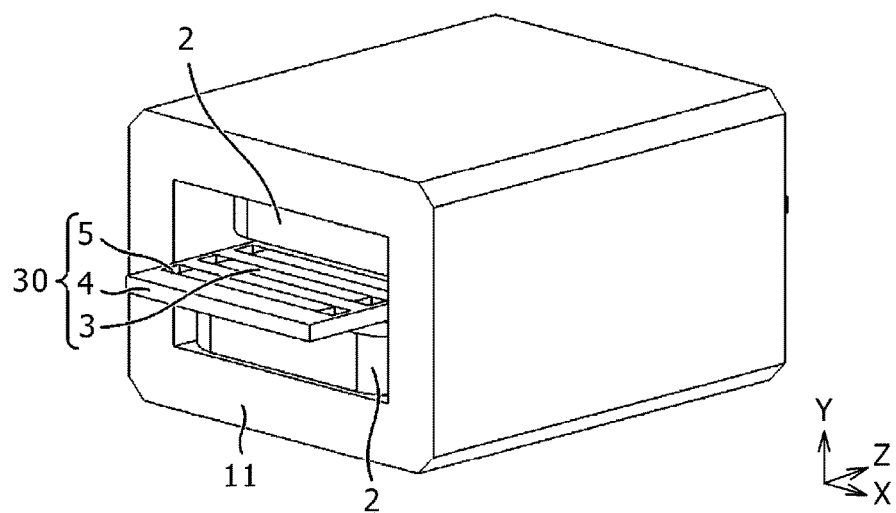
FIG. 4 is a conceptual diagram of one phase of a linear motor grooved in a lengthwise direction of magnets.
Figure 5:
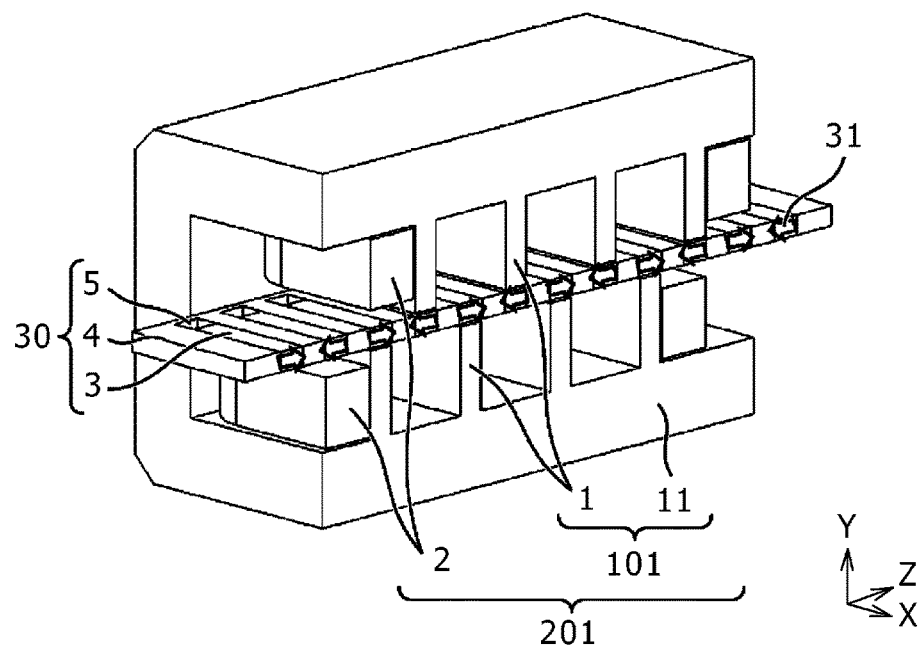
FIG. 5 is a schematic diagram showing an internal structure obtained by cutting off the linear motor structure of FIG. 4 along a Y-Z plane.

An example of a linear motor whose magnets become magnetized in a rectilinearly moving direction of a mover is described as a second embodiment below. FIG. 4 is a schematic diagram of a stator and mover constituting one phase of the linear motor according to the present embodiment. FIG. 5 is a schematic diagram showing an internal structure obtained by cutting off the linear motor structure of FIG. 4 along a Y-Z plane. In the present embodiment, four magnetic pole pieces each having upper and lower magnetic pole pieces around each of which a coil is wound are arranged in a direction of a Z-axis. The number of magnetic pole pieces, however, is not limited to four.

The mover 30 includes magnets 3, ladder-shaped members 4 of a magnetic material, and grooves 5. The stator 201 includes a magnetic circuit section 101. The magnetic circuit section 101 includes magnetic pole pieces 1 arranged in close proximity to the magnets 3 from above and below, and a magnetic material core 11 interconnecting the magnetic pole pieces 1. The magnetic pole pieces 1 are arranged in a direction of a Z-axis, and a common coil 2 is wound around each of the magnetic pole pieces 1. The coil 2 is wound around each of the upper and lower magnetic pole pieces 1.

In FIG. 5, a magnetization direction 31 of the magnets 3 is also shown schematically near a lateral face of each of the magnets. The magnets 3 are arranged at pitches of $\tau$ in the direction of the Z-axis. The magnets 3 become magnetized in both two vertical directions along a Y-axis, are each arrayed so as to become magnetized in an opposite direction with respect to adjacent magnets, and are each fixed to one of the ladder-shaped members 4 of a magnetic material. The grooves 5 are disposed in the ladder-shaped members 4 of a magnetic material. The grooves 5 are disposed at both sides of each of the magnets, in a direction of an X-axis.

In addition, the four magnetic pole pieces 1 disposed in the direction of the Z-axis are arranged at pitches of $2\tau$, which is twice the arrangement pitch of $\tau$ of the magnets. The upper and lower magnetic pole pieces 1 are arranged in staggered form, and are shifted by $\tau$ in the direction of the Z-axis.

The disposition of the grooves 5 in the ladder-shaped members 4 of a magnetic material, which constitute a part of the mover 30, reduces a weight of the mover 30, while at the same time suppressing magnetic flux shunting of the magnets and enhancing thrust. Response characteristics of the mover improve as a result.

In the present embodiment, a three-phase linear motor can be constructed by arranging three stators so that respective electrical phases shift by 120 degrees each. Similarly, a linear motor driven in an "m" number of phases can be constructed by arranging an "m" number of stators.

Third Embodiment

Figure 6:
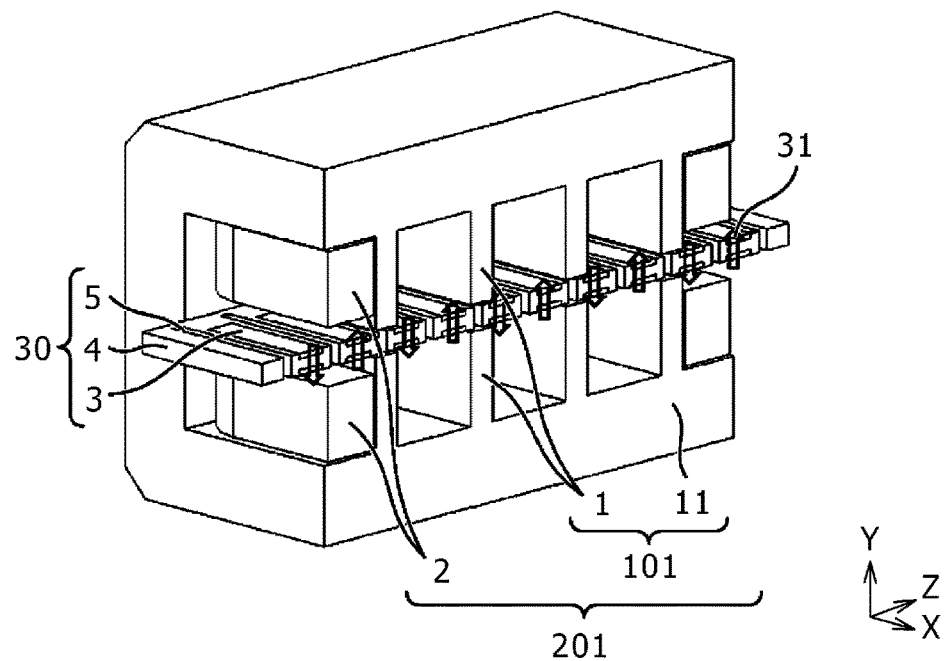
FIG. 6 is an explanatory diagram showing an embodiment in which a magnetization direction of magnets is in a direction of a Y-axis.

FIG. 6 shows a third embodiment of the present invention. FIG. 6 is a schematic diagram of a cut model obtained by cutting off the linear motor of FIG. 1 along a Y-Z plane. A mover 30 includes magnets 3, ladder-shaped members 4 of a magnetic material, and grooves 5. Grooves are formed in the ladder-shaped members 4 of a magnetic material, and the magnets 3 are each fixed thereto from an upper surface and a lower surface of the ladder-shaped members 4 with respect to an X-Z plane. This configuration yields advantageous effects of reduction in a weight of the mover and enhancement of thrust because of the grooves 5. In addition, this configuration reduces magnetic resistance in the mover 30 and enhances thrust with respect to a volume of the magnets.

A stator 201 includes a magnetic circuit section 101. The magnetic circuit section 101 includes magnetic pole pieces 1 arranged in close proximity to the magnets 3 from above and below, and a magnetic material core 11 interconnecting the magnetic pole pieces 1. The magnetic pole pieces 1 are arranged in a direction of a Z-axis, and a common coil 2 is wound around each of the magnetic pole pieces 1. The coil 2 is wound around each of the upper and lower magnetic pole pieces 1.

In the present embodiment, four magnetic pole pieces each having upper and lower magnetic pole pieces around each of which a coil is wound are arranged in the Z-axis direction. The number of magnetic pole pieces, however, is not limited to four.

Fourth Embodiment

Figure 7:
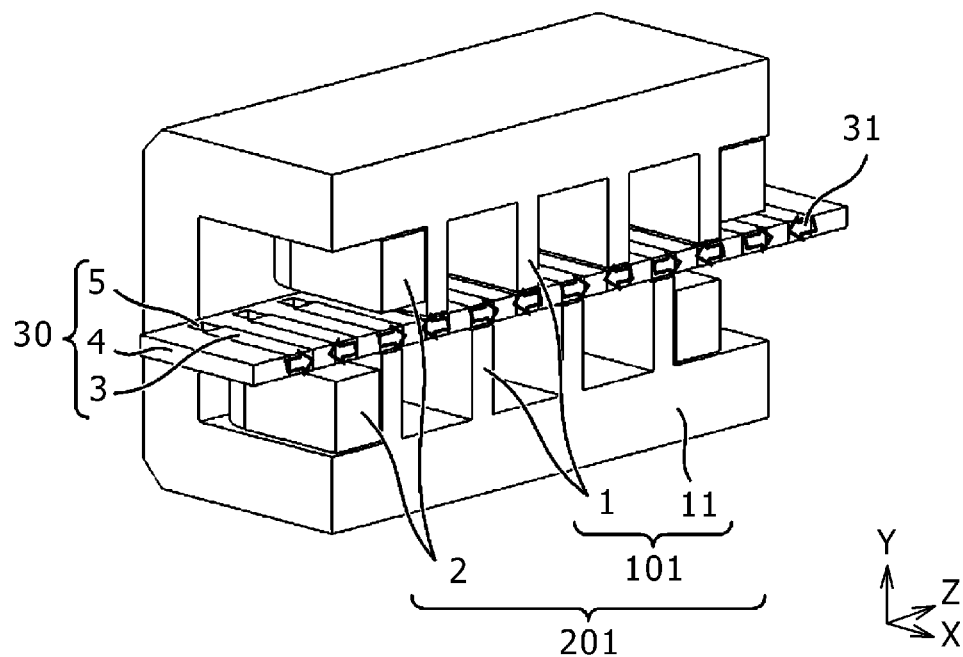
FIG. 7 is an explanatory diagram showing a structure which includes stepped grooves.
Figure 8:
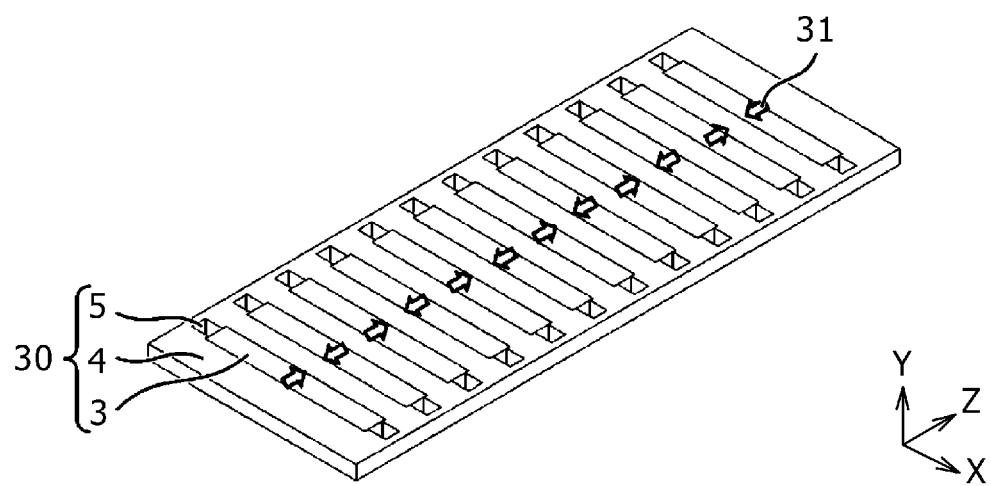
FIG. 8 is an explanatory diagram representing a mover shown in FIG. 7.

FIG. 7 shows a fourth embodiment of the present invention. FIG. 7 is a schematic diagram of another cut model obtained by cutting off the linear motor of FIG. 1 along a Y-Z plane. FIG. 8 shows a mover 30 of the present embodiment. In the present embodiment, grooves 5 in lengthwise positions of magnets 3 (i.e., in positions adjacent to a short side of the magnets 3) are each formed with a stepped portion at a boundary section with respect to the magnets 3. In other words, contact surfaces of the grooves 5 that mate with those of the magnets 3 each have an area smaller than that of a lateral face of the short side of the magnets 3.

This linear motor configuration reduces a weight of the mover 30, suppresses magnetic flux shunting of the magnets, and enhances thrust. In addition, since positions of the magnets can be defined at the stepped portions of the grooves 5, this configuration enhances arrangement accuracy of the magnets in the mover and hence raises positioning accuracy. Furthermore, variations in performance of the linear motor are reduced since variations in thrust due to shifts in the positions of the magnets can be prevented from occurring.

Fifth Embodiment

Figure 9:
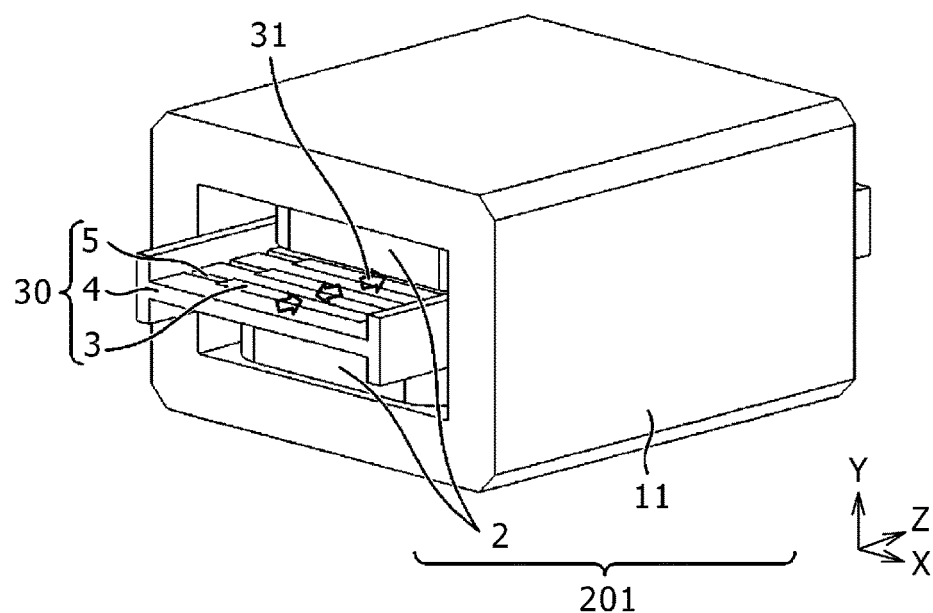
FIG. 9 is an explanatory diagram showing an embodiment in which a mover is formed to be H-shaped in cross section.
Figure 10:
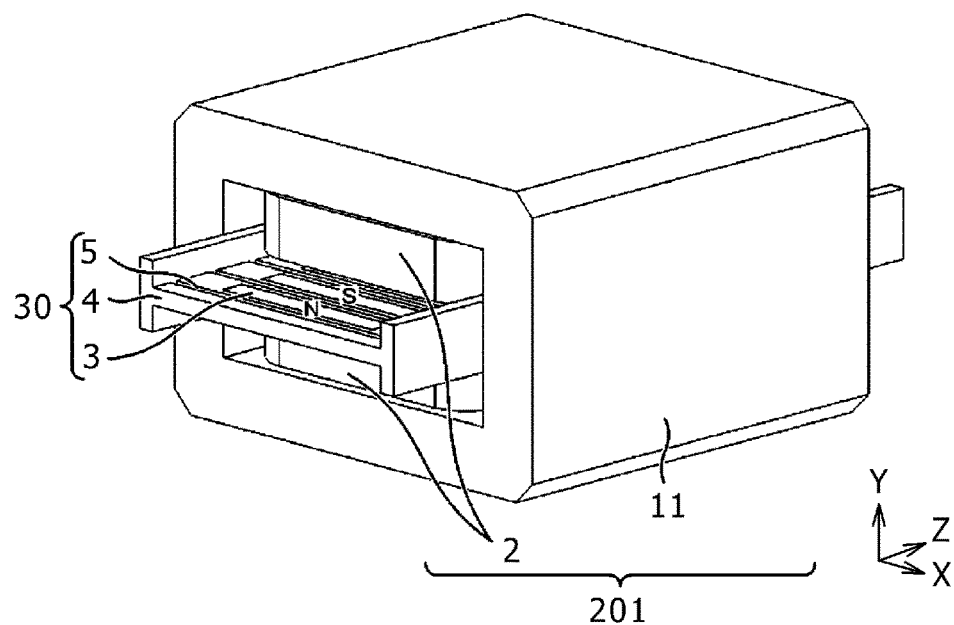
FIG. 10 is another explanatory diagram showing the embodiment in which the mover is formed to be H-shaped in cross section.

FIGS. 9 and 10 show a fifth embodiment of the present invention. FIG. 9 shows an example in which ladder-shaped members 4 of a magnetic material each have an H-shaped cross section on an X-Y plane (i.e., each of the ladder-shaped members 4 has a shape in which a side of the ladder-shaped member, which is parallel to a rectilinearly moving direction of the ladder-shaped member, extends in a direction perpendicular to the rectilinearly moving direction of a mover 30). In the example of FIG. 9, magnets 3 are arranged to become magnetized in a direction of a Z-axis. FIG. 10 shows an example of arranging magnets 3 so as to become magnetized in a direction of a Y-axis.

Rigidity can be enhanced by, as described above, forming the ladder-shaped members 4 of a magnetic material into the H-shaped cross-sectional shape. This in turn enables reduction in thickness of the mover 30 including the magnets 3 and the ladder-shaped members 4 of a magnetic material that surround the magnets, and thus enables reduction in the amount of magnet usage.

Sixth Embodiment

Figure 11:
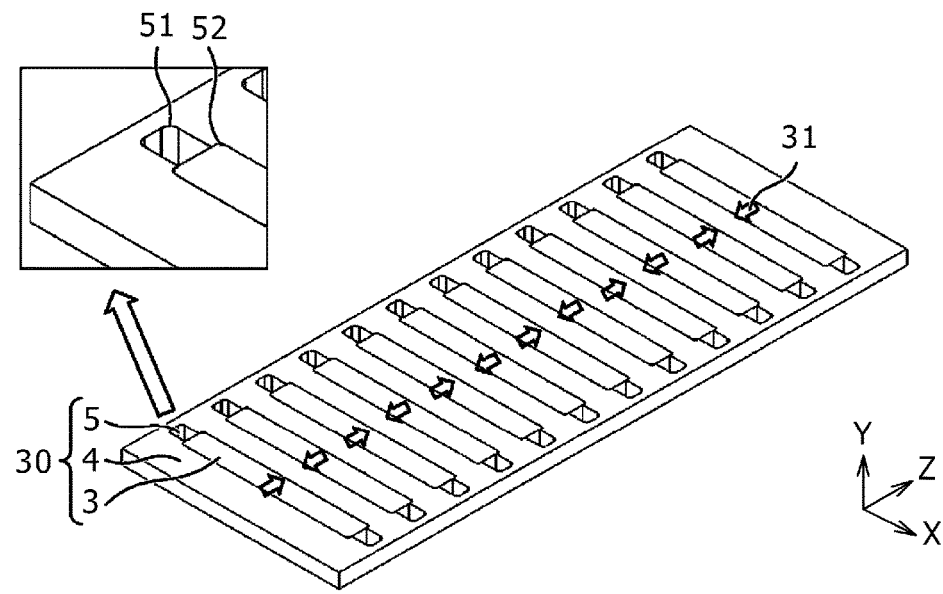
FIG. 11 is a first explanatory diagram showing a groove shape.
Figure 12:
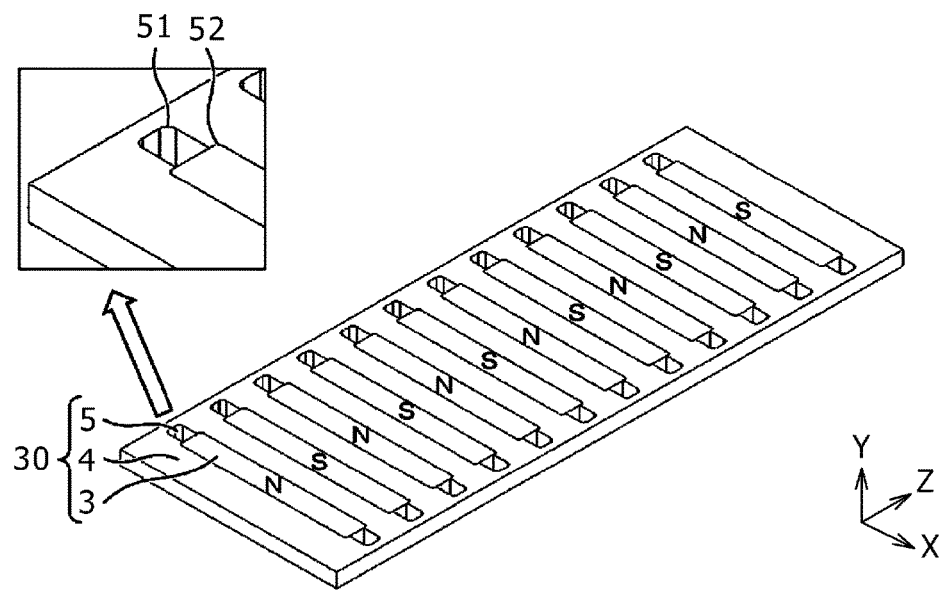
FIG. 12 is a second explanatory diagram showing the groove shape.

FIGS. 11 and 12 show a mover employed in a sixth embodiment of the present invention. Grooves 5 positioned lengthwise of magnets 3 in the mover 30 are shaped like an arc at corners of edges 51 of the groove. This shape suppresses deformation of the mover 30, enhances positioning accuracy, and prevents thrust from decreasing. The shape of the grooves 5 also enables ladder-shaped members 4 of a magnetic material to be easily machined with an end mill or the like.

Seventh Embodiment

Figure 13:
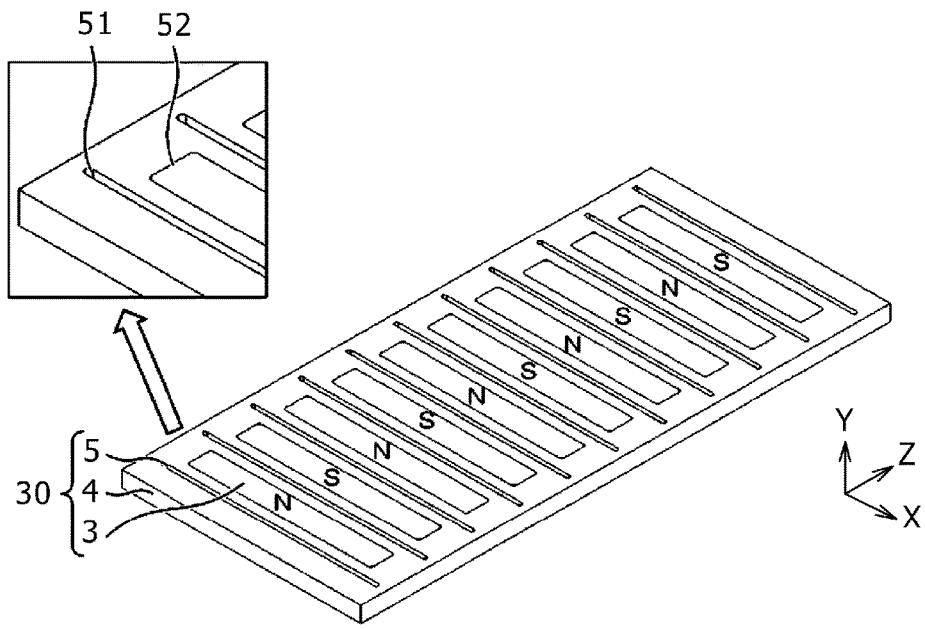
FIG. 13 is a third explanatory diagram showing another groove shape.

FIG. 13 shows a mover employed in a seventh embodiment of the present invention. In the present embodiment, the same mover 30 as that shown in FIGS. 1 and 2 is shaped like an arc at corners of edges 51 of grooves 5 and at corners of edges 52 of magnet insertion holes, so that deformation of the mover 30 is suppressed. This suppression effect allows positioning accuracy to be enhanced and thrust to be prevented from decreasing.

Eighth Embodiment

Figure 14:
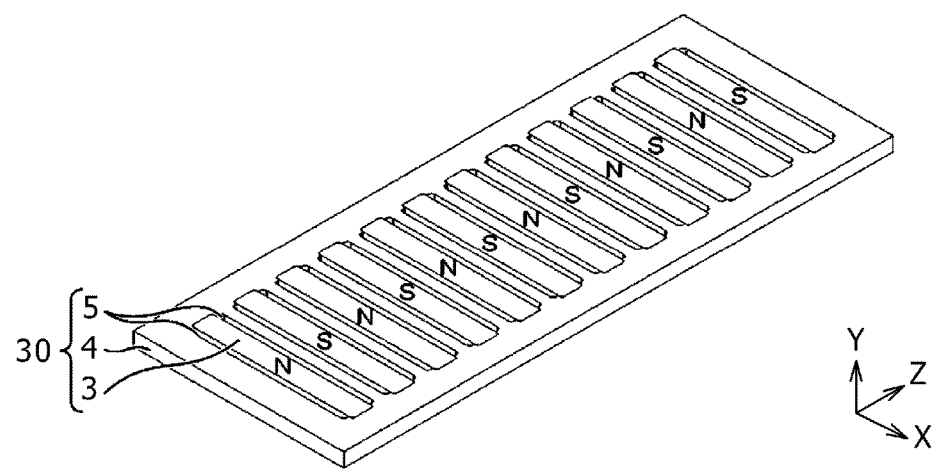
FIG. 14 is a fourth explanatory diagram showing the groove shape.

FIG. 14 shows a mover employed in an eighth embodiment of the present invention. The present embodiment is a modification of the embodiment shown in FIGS. 1 and 2. Grooves 5 are provided at Z-axial front and rear edges of magnets 3. This allows reduction in fabrication costs and fabrication time since the grooves 5 and holes for fixing the magnets 3 can be machined simultaneously with grooving.

Ninth Embodiment

Figure 15:
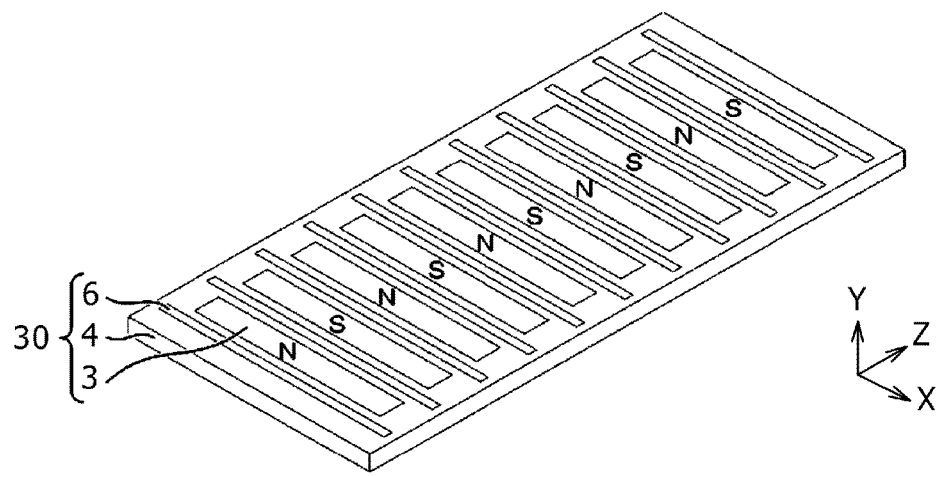
FIG. 15 is a first explanatory diagram showing a mover that includes non-magnetic fillers inserted thereinto.
Figure 16:
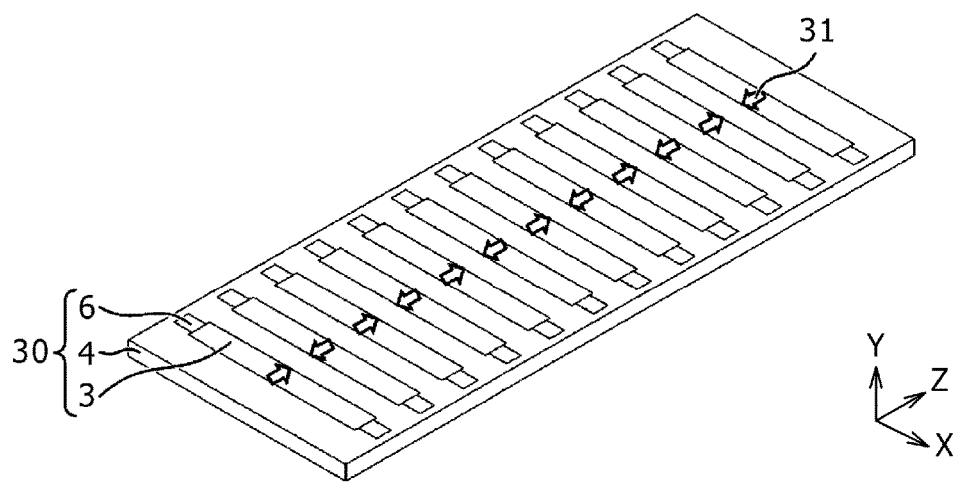
FIG. 16 is a second explanatory diagram showing the mover including the non-magnetic fillers inserted thereinto.
Figure 17:
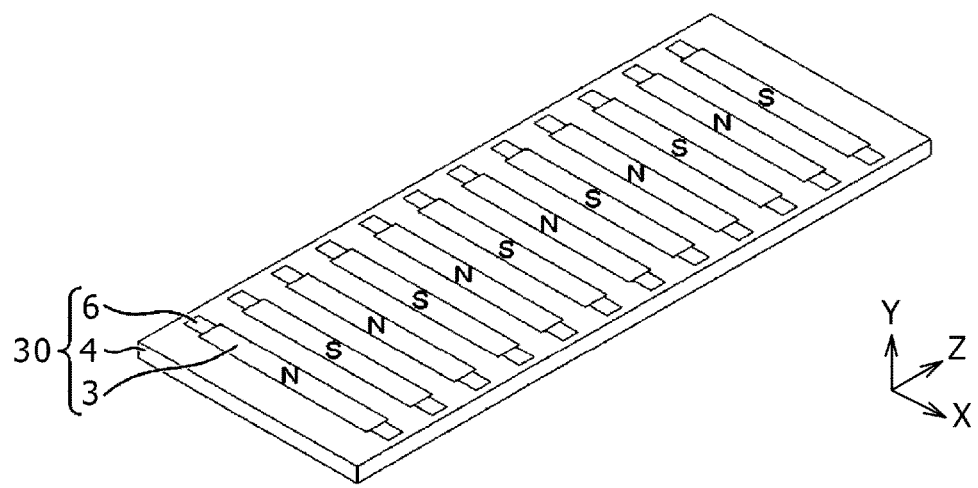
FIG. 17 is a third explanatory diagram showing the mover including the non-magnetic fillers inserted thereinto.

FIGS. 15, 16, and 17 show a mover 30 employed in a ninth embodiment of the present invention. The mover in the present embodiment includes non-magnetic fillers 6 inserted into grooves provided in the mover. This configuration of the embodiment is effective for reducing a weight of the mover and enhancing thrust. The configuration of the embodiment is also effective for suppressing a decrease in strength of the mover 30, since the non-magnetic fillers 6 are used instead of ladder-shaped members 4 of a magnetic material.

Tenth Embodiment

Figure 18:
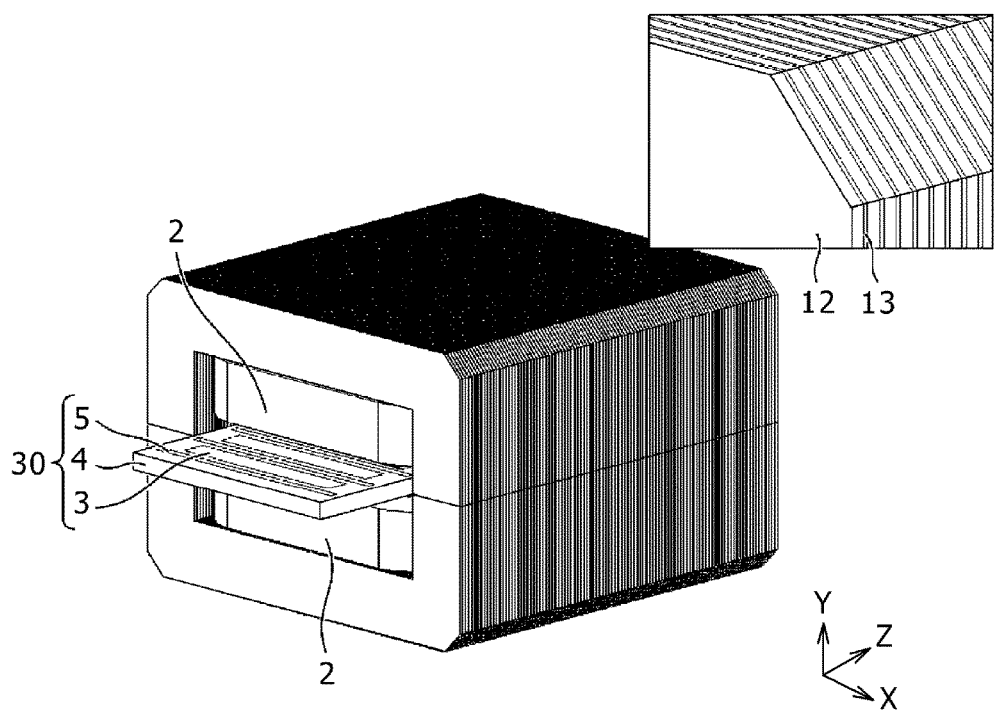
FIG. 18 is an explanatory diagram showing an embodiment which includes sheet metal members and adhesion layers.
Figure 19:
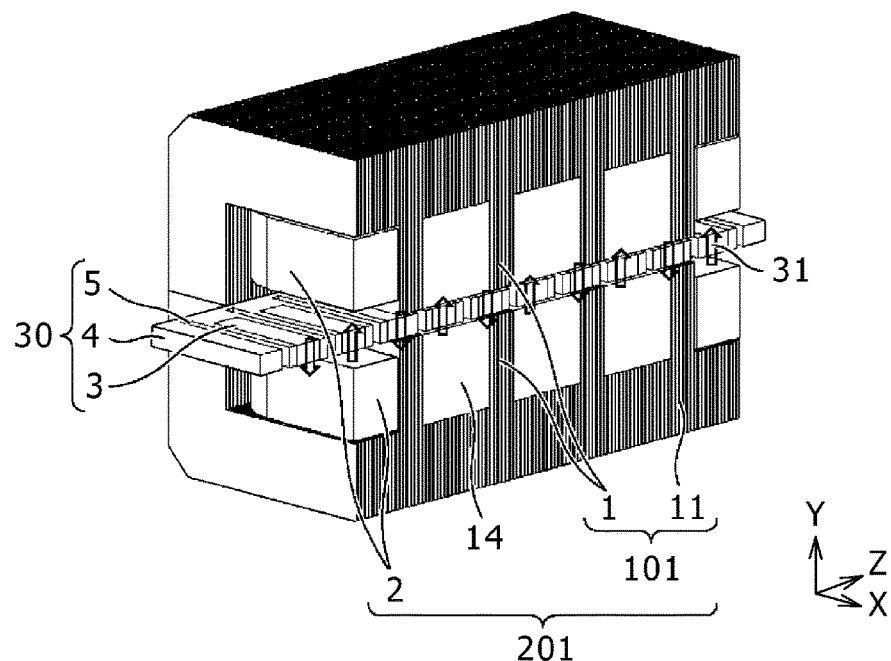
FIG. 19 is a diagram representing a cut model of a structure shown in FIG. 18.
Figure 20:
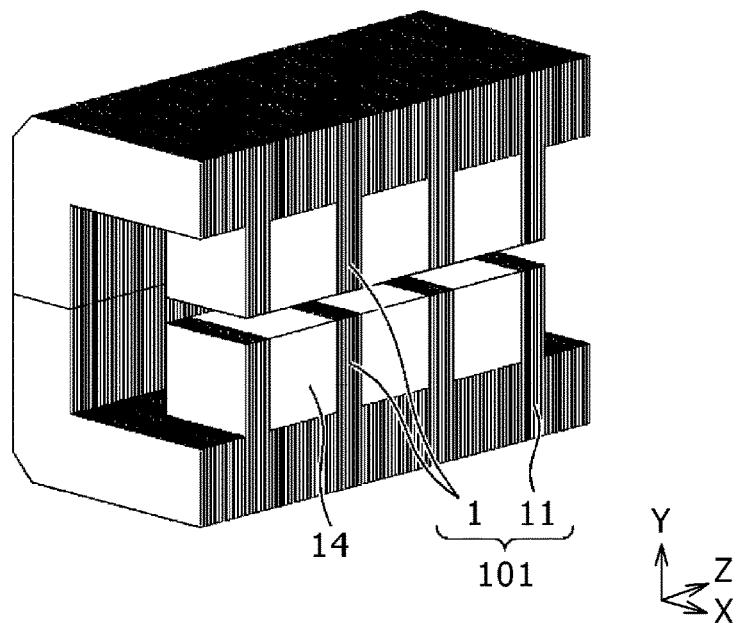
FIG. 20 is a diagram showing the cut model as represented without a mover and coil windings in the diagram of FIG. 19.

A tenth embodiment of the present invention is described below. FIG. 18 is a conceptual diagram of the present embodiment, and FIG. 19 is a schematic diagram showing an internal structure obtained by cutting off the linear motor structure of FIG. 18 along a Y-Z plane. FIG. 20 shows the internal structure as represented without a mover 30 and coil windings in the schematic diagram of FIG. 18.

Magnetic pole pieces 1 and a magnetic material core 11, both of which are constituent elements of a magnetic circuit section 101, are formed from sheet metal cores 12, and an adhesion layer 13 is disposed between every two of the sheet metal cores 12. With this structure, deformation of the magnetic pole pieces 1 and other unwanted events relating to elements of the magnetic circuit section can be reduced, which in turn allows suppression of decreases in positioning accuracy and response characteristics due to the deformation of the magnetic pole pieces 1.

Additionally, an interpole spacer 14 is inserted between every two of the magnetic pole pieces 1. This allows the deformation of the magnetic pole pieces 1 to be further reduced.

Eleventh Embodiment

Figure 21:
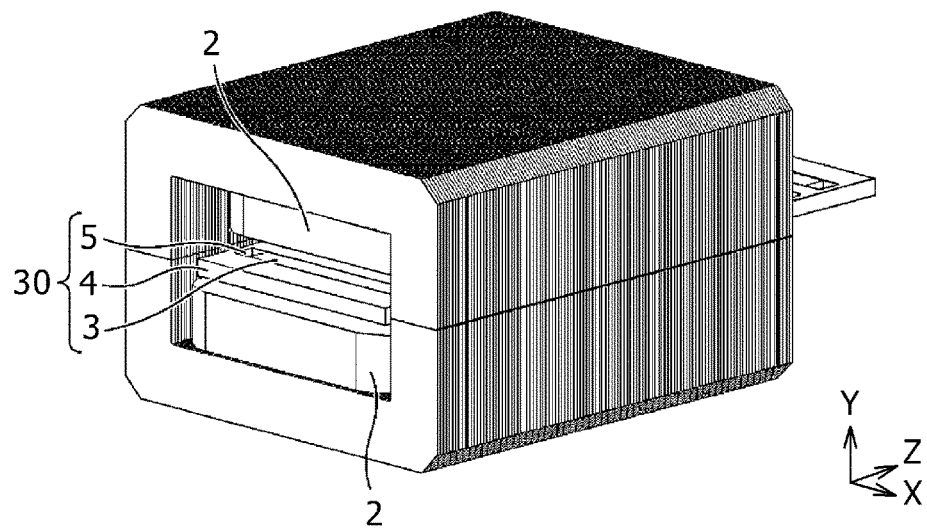
FIG. 21 is an explanatory diagram showing an embodiment which includes sheet metal members.
Figure 22:
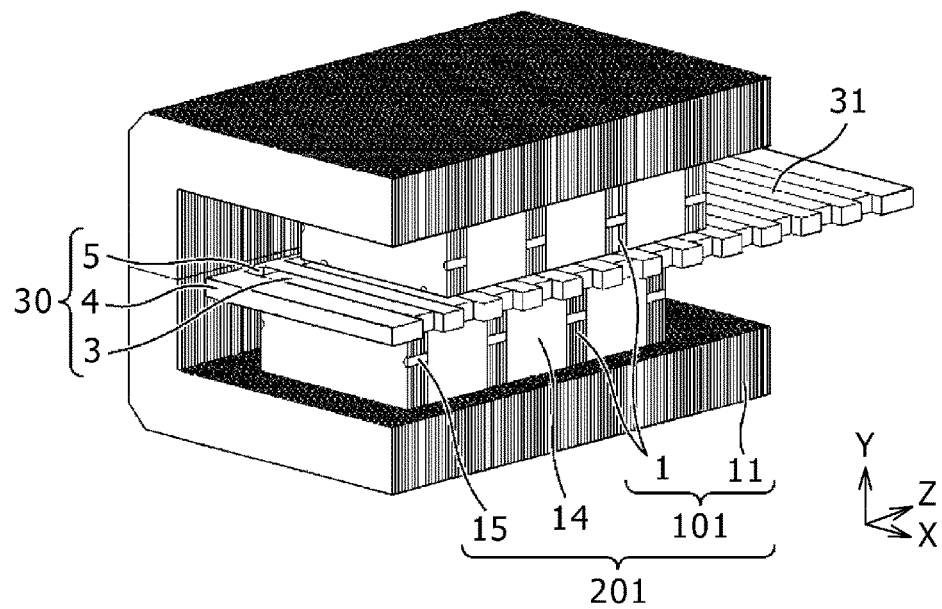
FIG. 22 is a diagram representing a cut model of a structure shown in FIG. 21.

An eleventh embodiment of the present invention is described below. FIG. 21 is a conceptual diagram of the present embodiment, and FIG. 22 is a schematic diagram showing an internal structure obtained by cutting off the linear motor structure of FIG. 21 along a Y-Z plane.

Magnetic pole pieces 1 and a magnetic material core 11, both of which are constituent elements of a magnetic circuit section 101, are formed from sheet metal cores 12, and the magnetic pole pieces 1 are each connected at a weld 15. Additionally, a non-magnetic interpole spacer 14 is inserted between every two of the magnetic pole pieces 1. With this structure, deformation of the magnetic pole pieces 1 and other unwanted events relating to elements of the magnetic circuit section can be reduce, which in turn allows suppression of decreases in positioning accuracy and response characteristics due to the deformation of the magnetic pole pieces 1.

Twelfth Embodiment

Figure 23:
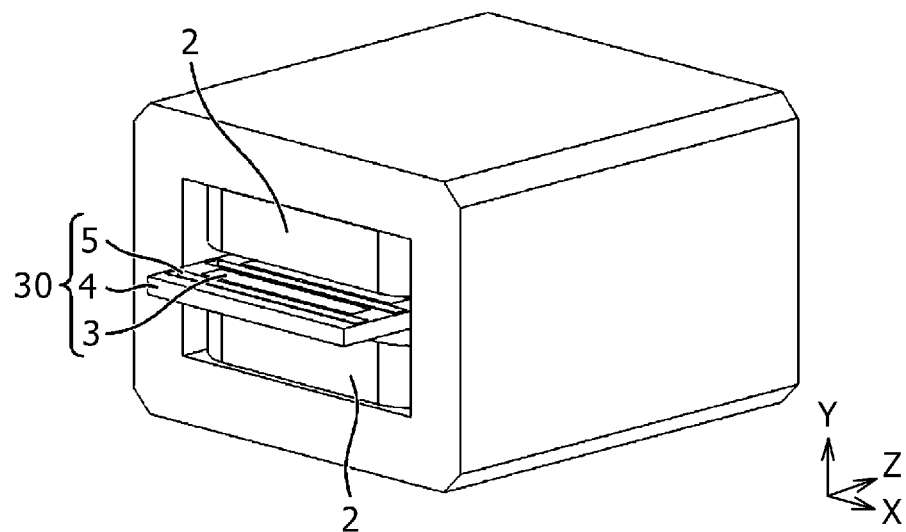
FIG. 23 is an explanatory diagram showing a shape of grooves.
Figure 24:
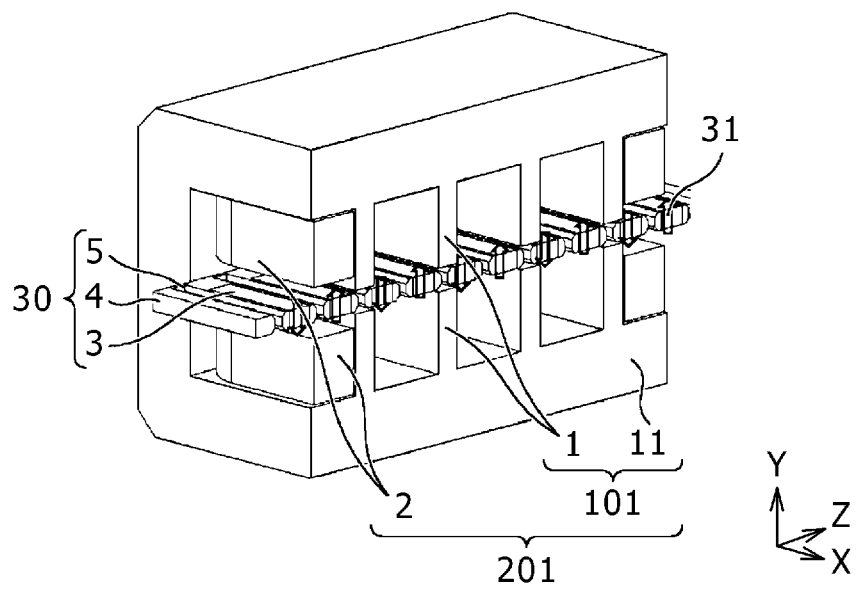
FIG. 24 is a diagram representing a cut model of a structure shown in FIG. 23.

A twelfth embodiment of the present invention is described below. FIG. 23 is a conceptual diagram of the present embodiment, and FIG. 24 is a schematic diagram showing an internal structure obtained by cutting off the linear motor structure of FIG. 23 along a Y-Z plane. In the present embodiment, edges of each of grooves 5 in ladder-shaped members 4 of a magnetic material are chamfered. This structure provides advantageous effects of reduction in ripple-like fluctuations of thrust in addition to reduction in a weight of a mover 30 and enhancement of thrust.

In conventional linear motors, when thrust is generated, magnetic pole pieces tend to deform, which leads to decreases in response characteristics and in positioning accuracy. In the present invention, however, any one of the above embodiments includes a non-magnetic member interposed between the magnetic poles, thus suppresses the deformation of the magnetic poles, and consequently enhances positioning accuracy and response characteristics.

In addition, the ladder-shaped members of a magnetic material in the present invention are grooved, which provides advantages of an increased surface area of the mover and hence, enhanced cooling performance.

In the embodiments, four magnetic pole pieces each having upper and lower magnetic pole pieces around each of which a coil is wound are arranged in the Z-axis direction. The number of magnetic pole pieces, however, is not limited to four.

Additionally, while the stator undertaking one phase of circuit composition to generate thrust has been mainly described in each of the embodiments, the stator may be used singly as an actuator or used in plurality as an element of a multiphase linear motor.

For example, a three-phase linear motor can be constructed by arranging three stators so that respective electrical phases shift by 120 degrees each. In general, a linear motor driven in an "m" number of phases can be constructed by arranging an "m" number of stators.

Furthermore, although in each of the embodiments the secondary side that includes the magnets and the ladder-shaped members of a magnetic material has been described as the mover side, the primary side that includes elements such as the magnetic circuit and coil windings can be constructed as the mover side by fixing the mover.

The linear motor according to any one of the embodiments of the present invention can be used in a positioning device and a molding machine, for example.

DESCRIPTION OF REFERENCE NUMBERS

1 Magnetic pole piece
2 Coil winding
3 Magnet
4 Ladder-shaped member of magnetic material
5 Groove
6 Non-magnetic filler
11 Magnetic material core
12 Sheet metal core
13 Adhesion layer
14 Interpole spacer
15 Weld
30 Mover
31 Direction of magnetization
51 Edge of groove
52 Edge of magnet insertion hole
101 Magnetic circuit section
201 Stator

The invention claimed is:

1. A linear motor comprising:
a secondary side including magnets and ladder-shaped members of a magnetic material, the magnets and the ladder-shaped members of the magnetic material being arranged in an alternate manner in a rectilinearly moving direction of the secondary side, each of the ladder-shaped members holding one of the magnets; and
a primary side including magnetic pole pieces arranged in close proximity to the secondary side from above and below in a first direction perpendicular to the rectilinearly moving direction with a common coil wound around each of the magnetic pole pieces, the primary side including a magnetic material core interconnecting the magnetic pole pieces;
wherein each of the ladder-shaped members of the magnetic material includes a first groove and a second groove formed at longitudinally opposing ends of each magnet such that the each magnet is disposed between the corresponding first and second grooves in a longitudinal direction of the each magnet, which is perpendicular to both the rectilinearly moving direction and the first direction, where each groove has a width in the rectilinearly moving direction different from a width of the corresponding magnet in the rectilinearly moving direction.

2. The linear motor according to claim 1, wherein:
the grooves each include a stepped portion.

3. The linear motor according to claim 1, wherein:
the ladder-shaped members of the magnetic material each have an H-shaped cross section.

4. The linear motor according to claim 1, wherein:
the grooves each have arc-shaped corners.

5. The linear motor according to claim 1, wherein:
a non-magnetic filler is inserted in each of the grooves.

6. The linear motor according to claim 1, wherein:
edges of the grooves are chamfered.

7. The linear motor according to claim 1, wherein:
the magnetic pole pieces or the magnetic material core interconnecting the magnetic pole pieces is formed from sheet metal cores, and an adhesion layer is disposed between the sheet metal cores.

8. The linear motor according to claim 1, wherein:
a non-magnetic interpole spacer is disposed between the magnetic pole pieces.

9. The linear motor according to claim 1, wherein:
the magnetic pole pieces are welded.

10. A positioning device employing the linear motor according to claim 1.

11. A molding machine employing the linear motor according to claim 1.

* * * * *